UNITED STATES PATENT OFFICE.

EDWARD C. BRICE, OF WASHINGTON, DISTRICT OF COLUMBIA.

COMPOSITION OF MATTER.

SPECIFICATION forming part of Letters Patent No. 555,425, dated February 25, 1896.

Application filed October 24, 1895. Serial No. 566,778. (No specimens.)

*To all whom it may concern:*

Be it known that I, EDWARD C. BRICE, a citizen of the United States, residing at Washington, District of Columbia, have invented certain new and useful Improvements in a Composition of Matter; and I do hereby declare the following to be a full, clear, and exact description of the invention, such as will enable others skilled in the art to which it appertains to make and use the same.

This invention relates to the manufacture of a new material to be used in the construction of melting-pots, crucibles, gas-retorts, muffles, fire-brick, furnace-linings, and furnace-fixtures, such as now used in various furnaces, &c.

The object of my invention is to create and produce, cheaply and expeditiously, a fireproof material to be used in the manufacture of the following vessels: glass-pots, to be used in the manufacture of glass; crucibles, to be used in melting-furnaces; gas-retorts, to be used in the manufacture of gas; fire-brick; also furnace-fixtures of any kind.

The forms which I produce are made from the material molded and burned.

The further object of this invention is to secure a vessel that will not crack or break when suddenly submitted to a red heat, which is now the case with vessels made of clay.

My composition of matter is composed of the following ingredients, in substantially the proportions stated, by weight: I take substantially four (4) parts of sand, substantially one (1) part of clay, and substantially two (2) parts of asbestos, and thoroughly mix the same together in a suitable vessel, where water is added in suitable proportions to make the mixed ingredients sufficiently moist to mold the same into shape. These forms or vessels are then placed in a suitable drying-kiln and dried, and the molded forms or vessels are placed in a suitable furnace and burned, when they are complete and ready for use as a finished product.

Having now explained my composition of matter used in the creation of these forms or vessels and the process employed by me in the production of the same, with full knowledge of the state of the art in respect thereto, what I claim to have invented, and desire to secure by Letters Patent, is—

A new composition of matter for making glass-pots, retorts, crucibles and fire-brick, which consists of substantially four (4) parts of sand substantially one (1) part of clay and substantially two (2) parts of asbestos, in about the proportions stated, as set forth.

In testimony whereof I affix my signature in presence of two witnesses.

EDWARD C. BRICE.

Witnesses:
    C. S. DRURY,
    J. B. NICHOLSON.